E. W. HOLT.
TIRE-UPSETTER.
No. 181,845. Patented Sept. 5, 1876.
FIG. I.
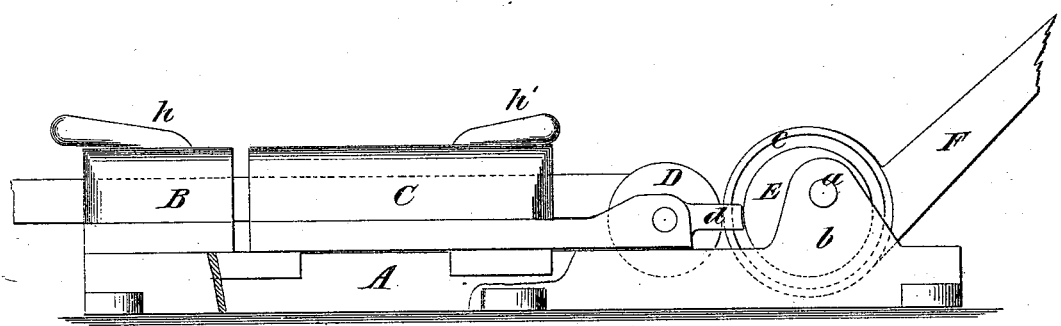
FIG. II.
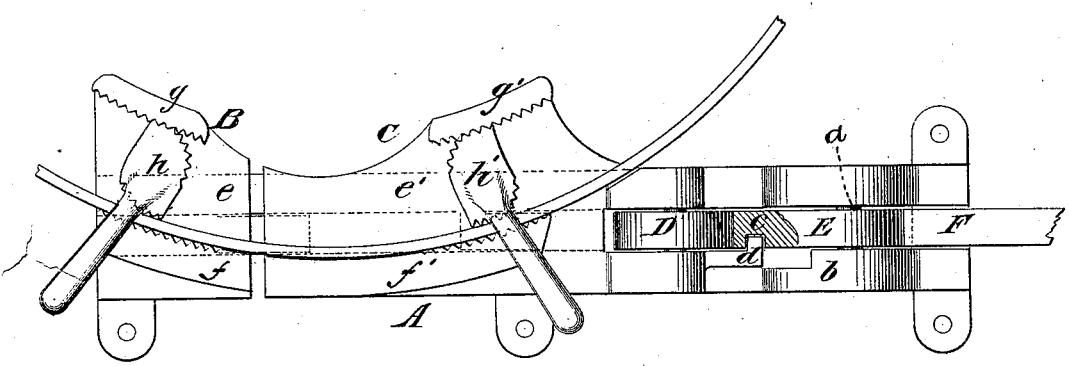
WITNESSES:
Gustave Dieterich
John Goethals
INVENTOR:
E. W. Holt
BY
ATTORNEYS.

UNITED STATES PATENT OFFICE.

EDWARD W. HOLT, OF CORINNA, MAINE.

IMPROVEMENT IN TIRE-UPSETTERS.

Specification forming part of Letters Patent No. 181,845, dated September 5, 1876; application filed July 31, 1876.

*To all whom it may concern:*

Be it known that I, EDWARD W. HOLT, of Corinna, in the county of Penobscot and State of Maine, have invented a new and Improved Tire-Upsetter, of which the following is a specification:

Figure 1 is a side elevation. Fig. 2 is a top view.

Similar letters of reference indicate corresponding parts.

The object of my invention is to easily and quickly upset the tires of wagon-wheels without changing the form of the tires or cutting them apart.

The invention consists of a pair of arc-shaped jaws, provided with fluted cams or dogs, that engage with fluted lugs on the jaws to clamp the tire. One of the jaws is fixed to the bed-piece, and the other is capable of being moved in ways in the bed by an eccentric pivoted to the bed and bearing against a roller in the movable jaw.

A is the bed of the machine, and B is an arc-shaped jaw fixed to the end of the bed-piece. C is a movable jaw sliding in ways in the bed, and carrying a roller, D. E is an eccentric, turning on a pin, $a$, which passes through ears $b$, cast on the bed. The eccentric bears against the roller D, and is provided with a groove, $c$, with which a draw-hook, $d$, engages to draw the jaw C back. The jaws B and C consist of the bed-plates $e\ e'$, to which the fluted arc-shaped ribs $f\ f'$ and the fluted lugs $g\ g'$ are attached. The fluted cams $h\ h'$ are capable of engaging with the lugs $g\ g'$, and forcing the tire against the ribs $f\ f'$ with a force proportionate to that exerted in closing the jaws.

The operation is as follows: The jaws are thrown apart, and the tire, being duly heated at the point where it is to be upset, is placed flatwise against the ribs $f\ f'$, the tire lying in the same plane as the bed of the machine. The fluted cams $h\ h'$ are now placed against the lugs $g\ g'$, and turned until they engage the tire. The eccentric is now turned by the lever F forcing the jaw C toward the jaw B, upsetting the tire. If there is a tendency in the tire to buckle it may be hammered as the jaws are forced together.

Having thus described my invention, I claim as new and desire to secure by Letters Patent—

1. The combination of the fluted cams $h\ h'$, jaws B C, having the ribs $f\ f'$ and the fluted lugs $g\ g'$, the roller D, eccentric E, and bed-piece A, substantially as shown and described.

2. In a tire-upsetter, the fluted cams $h\ h'$ and the fluted lugs $g\ g'$, arranged and operating substantially as shown and described.

EDWARD W. HOLT.

Witnesses:
 E. FOLSOM,
 H. A. FURBUSH.